US010969654B2

(12) United States Patent
Seo et al.

(10) Patent No.: US 10,969,654 B2
(45) Date of Patent: Apr. 6, 2021

(54) APERTURE MODULE AND CAMERA MODULE INCLUDING THE SAME

(71) Applicant: Samsung Electro-Mechanics Co., Ltd., Suwon-si (KR)

(72) Inventors: Bo Sung Seo, Suwon-si (KR); Young Bok Yoon, Suwon-si (KR); Kyung Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/776,862

(22) Filed: Jan. 30, 2020

(65) Prior Publication Data
US 2020/0401014 A1    Dec. 24, 2020

(30) Foreign Application Priority Data

Jun. 18, 2019   (KR) .......................... 10-2019-0072017

(51) Int. Cl.
| G03B 9/06 | (2021.01) |
| H04N 5/225 | (2006.01) |
| G03B 13/36 | (2021.01) |
| G03B 9/20 | (2021.01) |

(52) U.S. Cl.
CPC ................. G03B 9/06 (2013.01); G03B 9/20 (2013.01); G03B 13/36 (2013.01); H04N 5/2254 (2013.01)

(58) Field of Classification Search
CPC ...................................................... G03B 9/06
See application file for complete search history.

(56) References Cited

U.S. PATENT DOCUMENTS

| 6,853,810 | B1 * | 2/2005 | Fujinaga | ................. | G03B 9/10 |
| | | | | | 396/269 |
| 7,338,222 | B2 * | 3/2008 | Numnual | ................ | G03B 9/02 |
| | | | | | 396/505 |

(Continued)

FOREIGN PATENT DOCUMENTS

| JP | 2004-45594 A | | 2/2004 |
| JP | 2007193202 A | * | 8/2007 |

(Continued)

OTHER PUBLICATIONS

Korean Office Action dated Aug. 19, 2020 in counterpart Korean Patent Application No. 10-2019-0072017 (6 pages in English, 5 pages in Korean).

*Primary Examiner* — Clayton E. LaBalle
*Assistant Examiner* — Leon W Rhodes, Jr.
(74) *Attorney, Agent, or Firm* — NSIP Law

(57) ABSTRACT

An aperture module includes a rotation plate disposed on a base, a moving portion that moves linearly to rotate the rotation plate, and blades linked to the rotation plate to form an aperture having a variable size. The blades include at least two small-aperture blades that are contracted inwardly toward an optical axis to form the aperture having a first size and at least two medium-aperture blades that are contracted inwardly toward the optical axis to form the aperture having a second size larger than the first size. The at least two small-aperture blades and the at least two medium-aperture blades are extended outwardly away from the optical axis to form the aperture having a third size larger than the second size.

22 Claims, 15 Drawing Sheets

(56) References Cited

U.S. PATENT DOCUMENTS

| | | | |
|---|---|---|---|
| 8,475,064 B2* | 7/2013 | Bai | G03B 9/06 |
| | | | 396/463 |
| 8,717,493 B2* | 5/2014 | Han | H02K 41/0356 |
| | | | 348/367 |
| 2005/0025478 A1 | 2/2005 | Fujinaga | |
| 2012/0076486 A1 | 3/2012 | Bai et al. | |
| 2019/0058817 A1 | 2/2019 | Seo et al. | |

FOREIGN PATENT DOCUMENTS

| | | |
|---|---|---|
| JP | 2017-198935 A | 11/2017 |
| KR | 10-2009-0048841 A | 5/2009 |
| KR | 10-2012-0032433 A | 4/2012 |
| KR | 10-2012-0133910 A | 12/2015 |
| KR | 10-2019-0019797 A | 2/2019 |

\* cited by examiner

APERTURE MODULE AND CAMERA MODULE INCLUDING THE SAME

CROSS-REFERENCE TO RELATED APPLICATION(S)

This application claims the benefit under 35 USC 119(a) of Korean Patent Application No. 10-2019-0072017 filed on Jun. 18, 2019 in the Korean Intellectual Property Office, the entire disclosure of which is incorporated herein by reference for all purposes.

BACKGROUND

1. Field

The following description relates to an aperture module and a camera module including the same.

2. Description of Background

Camera modules have been standardly mounted in portable electronic devices such as smartphones, tablet PCs, laptop computers, and the like. A typical digital camera is provided with a mechanical aperture to adjust an amount of incident light according to a surrounding environment. However, a camera module, used in small products such as portable electronic devices, is difficult to provide a separate aperture due to structural characteristics and spatial limitations.

For example, due to various components configured to drive such an aperture, weight of a camera module may be increased to deteriorate an autofocusing (AF) function or an optical image stabilization (OIS) function. In the case in which an aperture itself is provided with a power connection part configured to drive the aperture, such as coils or the like, such a power connection part may interfere with vertical movement of a lens when autofocusing is performed.

Additionally, there may be a need for functions to reduce the amount of current used and to precisely adjust an incidence hole of an aperture module to various sizes.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aperture module which may implement an accurate aperture of an aperture stop with multiple stages while reducing power usage.

In one general aspect, an aperture module includes a rotation plate disposed on a base, a moving portion that moves linearly to rotate the rotation plate, and blades linked to the rotation plate to form an aperture having a variable size. The blades include at least two small-aperture blades that are contracted inwardly toward an optical axis to form the aperture having a first size and at least two medium-aperture blades that are contracted inwardly toward the optical axis to form the aperture having a second size larger than the first size. The at least two small-aperture blades and the at least two medium-aperture blades are extended outwardly away from the optical axis to form the aperture having a third size larger than the second size.

The at least two small-aperture blades may be contracted inwardly to form the aperture having the first size when the moving portion is moved to a first end of a linear path. The at least two medium-aperture blades may be contracted inwardly to form the aperture having the second size when the moving portion is moved to a second end of the linear path opposite the first end. The at least two small-aperture blades and the at least two medium-aperture blades may be extended outwardly to form the aperture having the third size when the moving portion is disposed at a predetermined position of the linear path between the first end and the second end.

The rotation plate may include a through-hole having a size larger than the second size, and the at least two small-aperture blades and the at least two medium-aperture blades may be extended outwardly to expose the through-hole when the moving portion is disposed at the predetermined position.

The aperture module may include a cover covering the base and including a through-hole, and the through-hole may have a size larger than the second size and smaller than the third size.

A shape of the aperture having the first size and a shape of the aperture having the second size may be circular.

Each of the blades may have a boomerang shape.

Each of the at least two small-aperture blades may have a circular arc-shaped groove that forms a portion of the aperture having the first size, and each of the at least two medium-aperture blades may have a circular arc-shaped groove that forms a portion of the aperture having the second size.

The rotation plate may include a first rotation shaft and the at least two small-aperture blades may be connected to the first rotation shaft to be driven in linkage to the rotation plate when the rotation plate is rotated. The rotation plate may include a second rotation shaft and the at least two medium-aperture blades may be connected to the second rotation shaft to be driven in linkage to the rotation plate when the rotation plate is rotated.

The base may include a first stationary shaft and the at least two small-aperture blades may be connected to the first stationary shaft. The base may include a second stationary shaft and the at least two medium-aperture blades may be connected to the second stationary shaft.

The first stationary shaft may be disposed symmetrically to the second stationary shaft with respect to the optical axis.

The at least two medium-aperture blades may be maintained in an outwardly extended state when the moving portion is moved from the predetermined position to the first end.

Each of the medium-aperture blades may include a rotation shaft hole into which a rotation shaft of the rotation plate is inserted, and the rotation shaft hole may include a section disposed parallel to a rotation direction of the rotation plate.

The at least two small-aperture blades may be maintained in an outwardly extended state when the moving portion is moved from the predetermined position to the second end.

Each of the small-aperture blades may include a rotation shaft hole into which a rotation shaft of the rotation plate is inserted, and the rotation shaft hole may include a section disposed parallel to a rotation direction of the rotation plate.

The at least two small-aperture blades may be contracted inwardly to form the aperture of the first size and the at least two medium-aperture blades may be extended outwardly to expose the aperture of the first size when the moving portion is moved to the first end.

The at least two medium-aperture blades may be contracted inwardly to form the aperture of the second size and the at least two small-aperture blades may be extended outwardly to expose the aperture of the second size when the moving portion is moved to the second end.

In another general aspect, an aperture module includes a rotation plate disposed on a base, a moving portion to move linearly to allow the rotation plate to rotate, and blades linked to the rotation plate to form an aperture having a variable size. The blades include at least two small-aperture blades contracted inwardly toward an optical axis to form the aperture having a first size when the moving portion is moved to a first end of a linear path and extended outwardly away from the optical axis when the moving portion is disposed at a predetermined position of the linear path between the first end and a second end of the linear path. The blades include at least two medium-aperture blades contracted inwardly toward the optical axis to form the aperture having a second size larger than the first size when the moving portion is disposed at the predetermined position. All of the blades extend outwardly away from the optical axis when the moving portion moves to the second end of the linear path.

In another general aspect, a camera module includes a housing, a lens module accommodated in the housing and including a lens barrel having one or more lenses, and an aperture module disposed between an object and the lens module to adjust an amount of incident light on the one or more lenses. The aperture module includes a moving portion to move along a linear path and blades to rotate based on movement of the moving portion along the linear path to form an aperture through which the incident light passes. The blades include at least two first blades to be rotated inwardly toward an optical axis to form the aperture having a first size and at least two second blades to be rotated inwardly toward the optical axis independently of the at least two first blades to form the aperture having a second size larger than the first size.

The at least two first blades and the at least two second blades may be rotated outwardly away from the optical axis to form the aperture having a third size different from the first size and the second size.

The at least two first blades may form the aperture having the first size when the moving portion is disposed at a first end of the linear path, the at least two second blades may form the aperture having the second size when the moving portion is disposed at a second end of the linear path, and the at least two first blades and the at least two second blades may form the aperture having the third size when the moving portion is disposed at a position between the first end and the second end of the linear path.

The third size may be larger than the first size and the second size.

The third size may larger than the first size and smaller than the second size.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
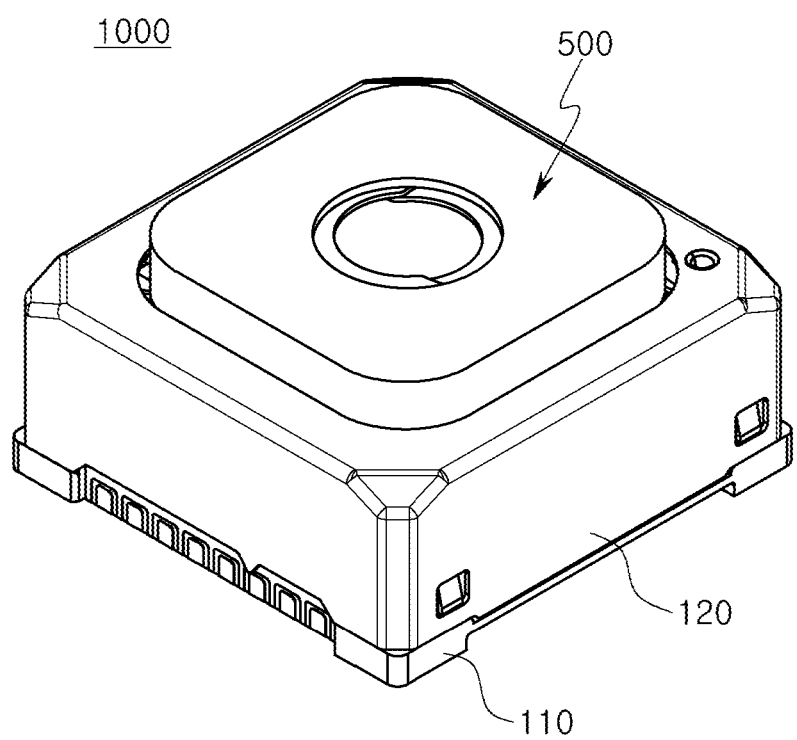
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, will be described in detail with reference to the accompanying drawings.

A camera module according to the examples may be mounted in a portable electronic device such as a mobile communications terminal, a smartphone, a tablet personal computer (PC), or the like.

Figure 2:
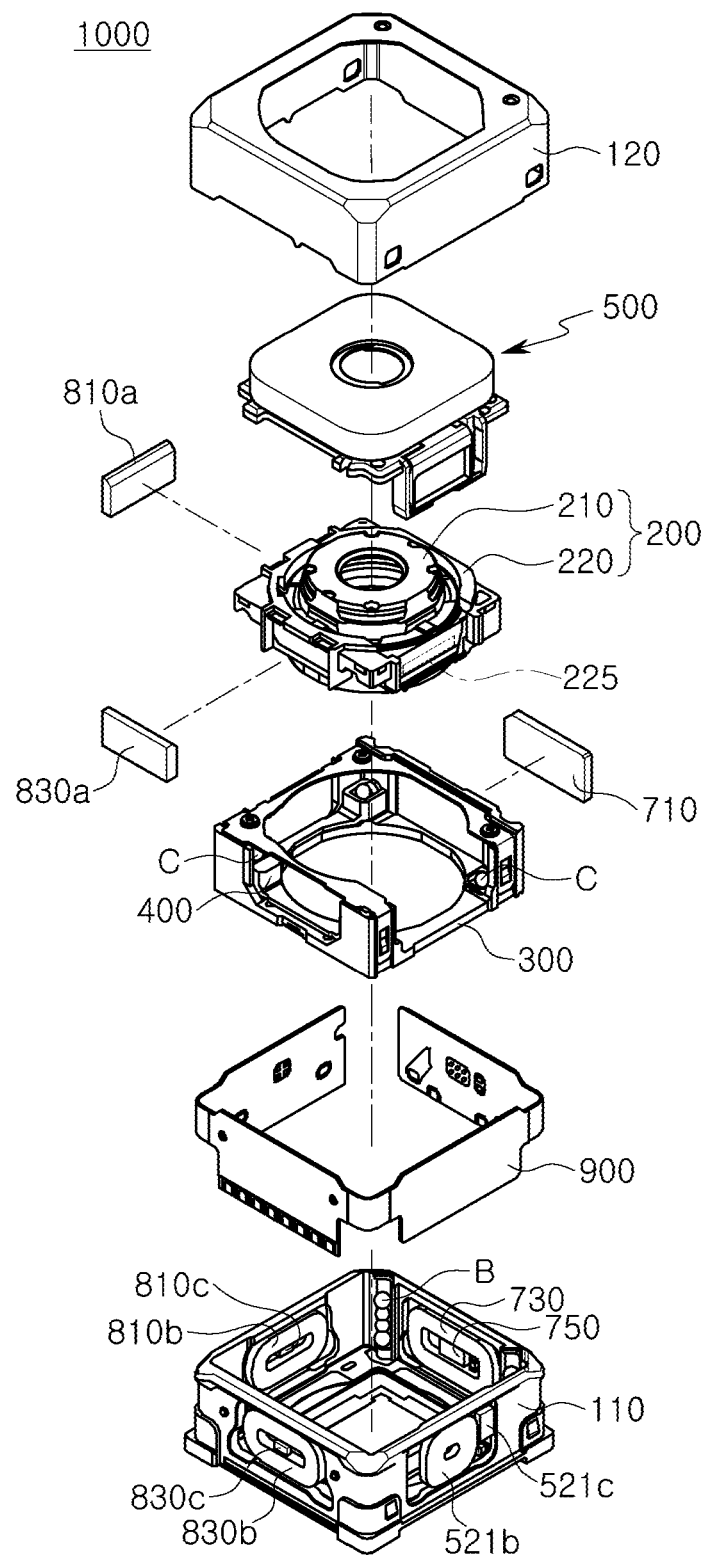
FIG. 2 is an exploded perspective view of a camera module according to an example.
Figure 3A:
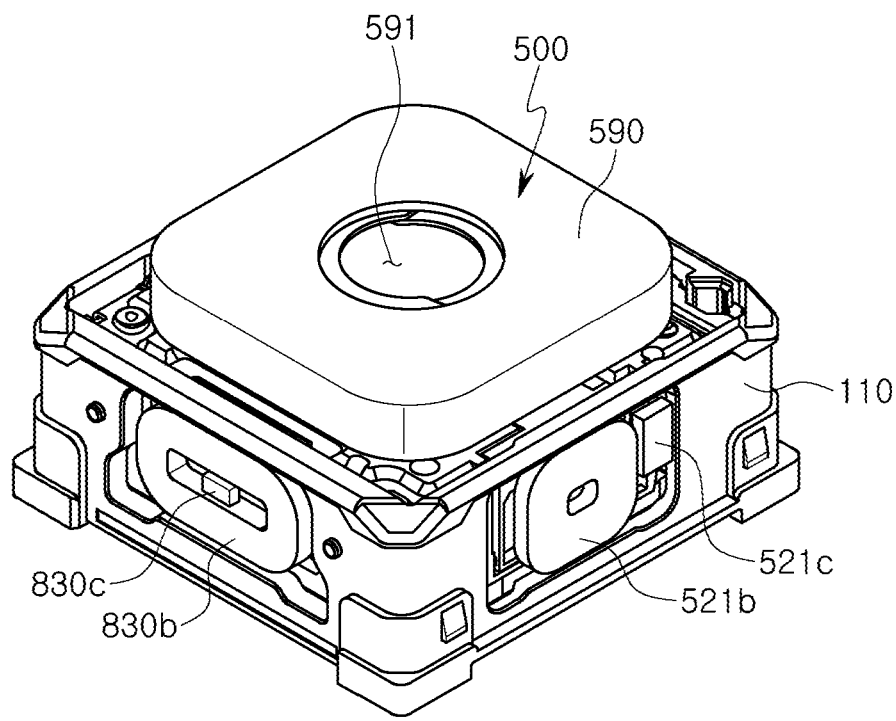
FIG. 3A is a perspective view of a portion of a camera module according to an example.
Figure 3B:
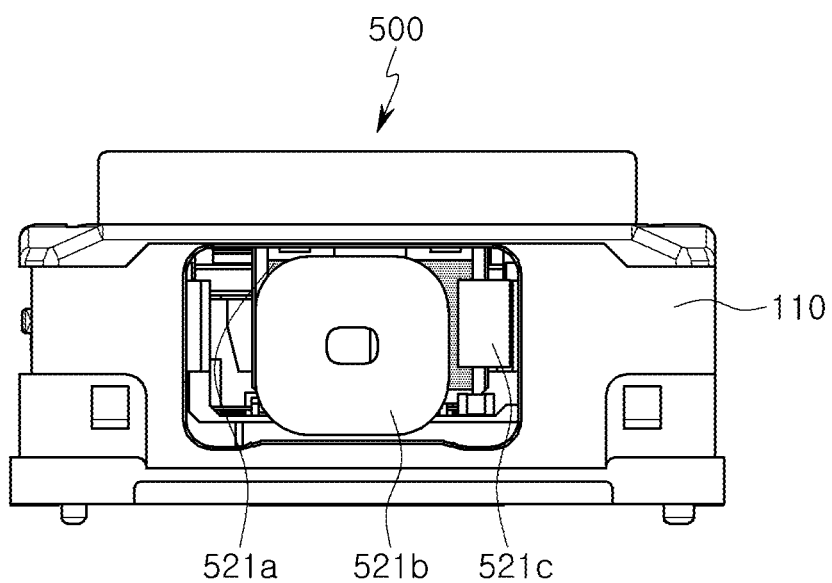
FIG. 3B is a side view of the camera module illustrated in FIG. 3A.

FIG. 1 is a perspective view of a camera module according to an example, and FIG. 2 is an exploded perspective view of a camera module according to an example. FIG. 3A is a perspective view of a portion of a camera module according to an example, and FIG. 3B is a side view of the camera module of FIG. 3A.

Referring to FIGS. 1 through 3B, a camera module 1000 may include a lens module 200, a carrier 300, a guide portion 400, an aperture module 500, a housing 110, and a case 120.

The lens module 200 may include a lens barrel 210, including a plurality of lenses capturing a subject, and a holder 220 accommodating the lens barrel 210. The plurality of lenses may be disposed in the lens barrel 210. The lens module 200 may be accommodated in the carrier 300.

The lens module 200 may be configured to be movable in an optical axis direction for focusing. As an example, the lens module 200 may be moved in the optical axis direction together with the carrier 300 by a focusing portion.

The focusing portion may include a magnet 710 and a coil 730 generating driving force in the optical axis direction. In addition, the camera module 1000 may include a position sensor 750, for example, a Hall sensor, to sense a position of the lens module 200, for example, the carrier 300 in the optical axis direction.

The magnet 710 may be mounted on the carrier 300. As an example, the magnet 710 may be mounted on one surface of the carrier 300.

The coil (AF driving coil) 730 and the position sensor 750 may be mounted in the housing 110. As an example, the coil 730 and the position sensor 750 may be fixed to the housing 110 to face the magnet 710. The coil 730 and the position sensor 750 may be provided on a substrate 900, and the substrate 900 may be mounted in the housing 110.

The magnet 710 may be a movable member, mounted on the carrier 300 to move in the optical axis direction together with the carrier 300, and the coil 730 and the position sensor 750 may be fixed members fixed to the housing 110.

When power is applied to the coil 730, the carrier 300 may be moved in the optical axis direction by electromagnetic interaction between the magnet 710 and the coil 730. In addition, the position sensor 750 may sense a position of the carrier 300 in the optical axis direction.

Since the lens module 200 is accommodated in the carrier 300, the lens module 200 may also be moved in the optical axis direction together with the carrier 300 by the movement of the carrier 300.

The aperture module 500, mounted on the lens module 200, may also be moved in the optical axis direction together with the lens module 200.

A rolling member B may be disposed between the carrier 300 and the housing 110 to reduce friction between the carrier 300 and the housing 110 when the carrier 300 is moved. The rolling member B may have a ball shape.

The rolling member B is disposed on both sides of the magnet 710 (or the coil 730).

A yoke may be mounted on the substrate 900. As an example, the yoke and the magnet 710 may be disposed to face each other with the coil 730 interposed therebetween.

Attractive force may act between the yoke and the magnet 710 in a direction perpendicular to the optical axis direction.

Accordingly, the rolling member B may be maintained in a state of contact with the carrier 300 and the housing 110 by the attractive force between the yoke and the magnet 710.

In addition, the yoke may serve to focus magnetic force of the magnet 710. Accordingly, generation of a leakage flux may be prevented.

As an example, the yoke and the magnet 710 may form a magnetic circuit.

To correct image shaking caused by user's handshaking or the like, the lens module 200 may be moved in a first direction, perpendicular to an optical axis, and a second direction, perpendicular to the optical axis and the first direction.

For example, a shaking correction portion may provide a relative displacement, corresponding to shaking, to the lens module 200 to compensate for the shaking when the shaking occurs due to user's handshaking or the like during image capturing.

The guide portion 400 may be accommodated in the carrier 300 and mounted on an upper portion of the carrier 300 in the optical axis direction. The holder 220 may be mounted on the guide portion 400. A ball member C, serving as a rolling bearing, may be provided between the carrier 300 and the guide portion 400 in the optical axis direction and between the guide portion 400 and the holder 220 in the optical axis direction.

The guide portion 400 may be configured to guide the lens module 200 when the lens module 200 is moved in the first and second directions, perpendicular to the optical axis.

As an example, the lens module 200 may be relatively moved in the first direction with respect to the guide portion 400, and the guide portion 400 and the lens module 200 may be moved together within the carrier 300 in the second direction.

The shaking correction portion may include a plurality of magnets 810a and 830a and a plurality of coils (a first OIS driving coil and a second OIS driving coil) 810b and 830b. In addition, the shaking correction portion may include a plurality of position sensors 810c and 830c, for example, Hall sensors, to sense positions of the lens module 200 in the first direction and the second direction.

Among the plurality of magnets 810a and 830a and the plurality of coils 810b and 830b, one magnet 810a and one coil 810b may be disposed to face each other in the first direction to generate driving force in the first direction, and the other magnet 830a and the other coil 830b may be disposed to face each other in the second direction to generate driving force in the second direction.

The plurality of magnets 810a and 830a may be mounted on the lens module 200, and the plurality of coils 810b and 830b and the plurality of position sensors 810c and 830c facing the plurality of magnets 810a and 830a may be fixed to the housing 110. As an example, the plurality of coils 810b and 830b and the plurality of position sensors 810c and 830c may be provided on the substrate 900 and the substrate 900 may be mounted on the housing 110.

The plurality of magnets 810a and 830a may be movable members moved together with the lens module 200 in the first direction and the second direction, and the plurality of coils 810b and 830b and the plurality of position sensors 810c and 830c may be fixed members fixed to the housing 110.

The ball members C may be provided to support the guide portion 400 and the lens module 200. The ball members C may serve to guide the guide portion 400 and the lens module 200 during shaking correction.

The ball members C may be provided between the carrier 300 and the guide portion 400, between the carrier 300 and the lens module 200, and between the guide portion 400 and the lens module 200.

When driving force is generated in the first direction, the ball members C, disposed between the carrier 300 and the guide portion 400 and between the carrier 300 and the lens module 200, may roll in the first direction. Accordingly, the ball members C may guide the movement of the guide portion 400 and the lens module 200 in the first direction.

When the driving force is generated in the second direction, the ball members C, disposed between the guide portion 400 and the lens module 200 and between the carrier 300 and the lens module 200, may roll in the second direction. Accordingly, the ball members C may guide the movement of the lens module 200 in the second direction.

The lens module 200 and the carrier 300 may be accommodated in the housing 110. As an example, the housing 110 may be in the form of a substantial square box having open top and open bottom, and may be provided with an internal space in which the lens module 200 and the carrier 300 are accommodated.

A printed circuit board (PCB) may be disposed below the housing 110.

The case 120 may be coupled to the housing 110 to surround external surfaces of the housing 110, and may serve to protect internal components of the camera module 1000. In addition, the case 120 may serve to shield electromagnetic waves.

As an example, the case 120 may shield electromagnetic waves generated from the camera module 1000 in such a manner that the electromagnetic waves do not affect other electronic components in the portable electronic device.

Since various electronic components as well as the camera module are mounted in the portable electronic device, the case 120 may shield electromagnetic waves generated from such electronic components in such a manner that the electromagnetic waves do not affect the camera module 1000.

The case 120 may be formed of a metal to be grounded to a ground pad provided on the printed circuit board. Thus, the case 120 may shield electromagnetic waves.

The aperture module 500 may be configured to selectively change an amount of light incident on the lens module 200.

As an example, the aperture modules 500 may be provided with a plurality of blades by which incidence holes, having different sizes to each other, may be continuously implemented. Light may be incident through one of the incidence holes, having different sizes to each other, depending on a capturing environment.

Figure 4:
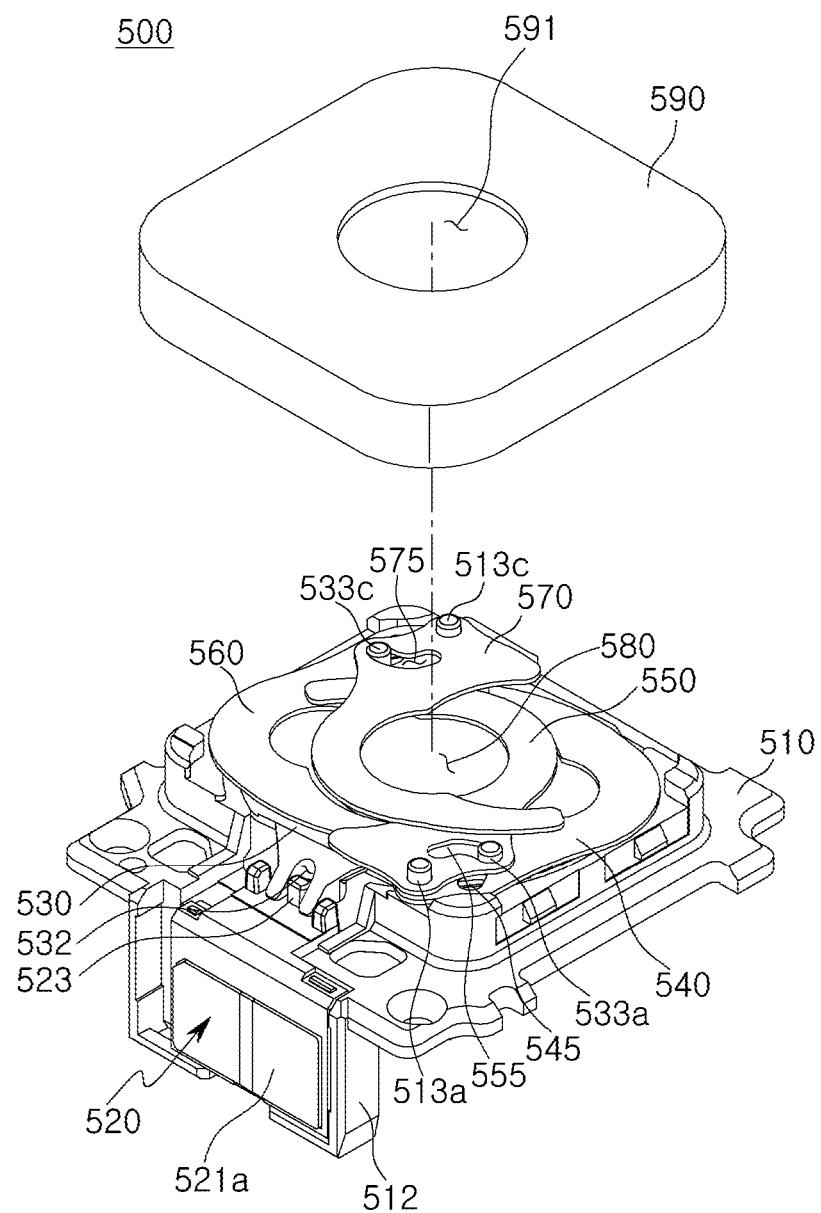
FIG. 4 is a coupled perspective view of an aperture module, with a cover removed, according to an example.
Figure 5:
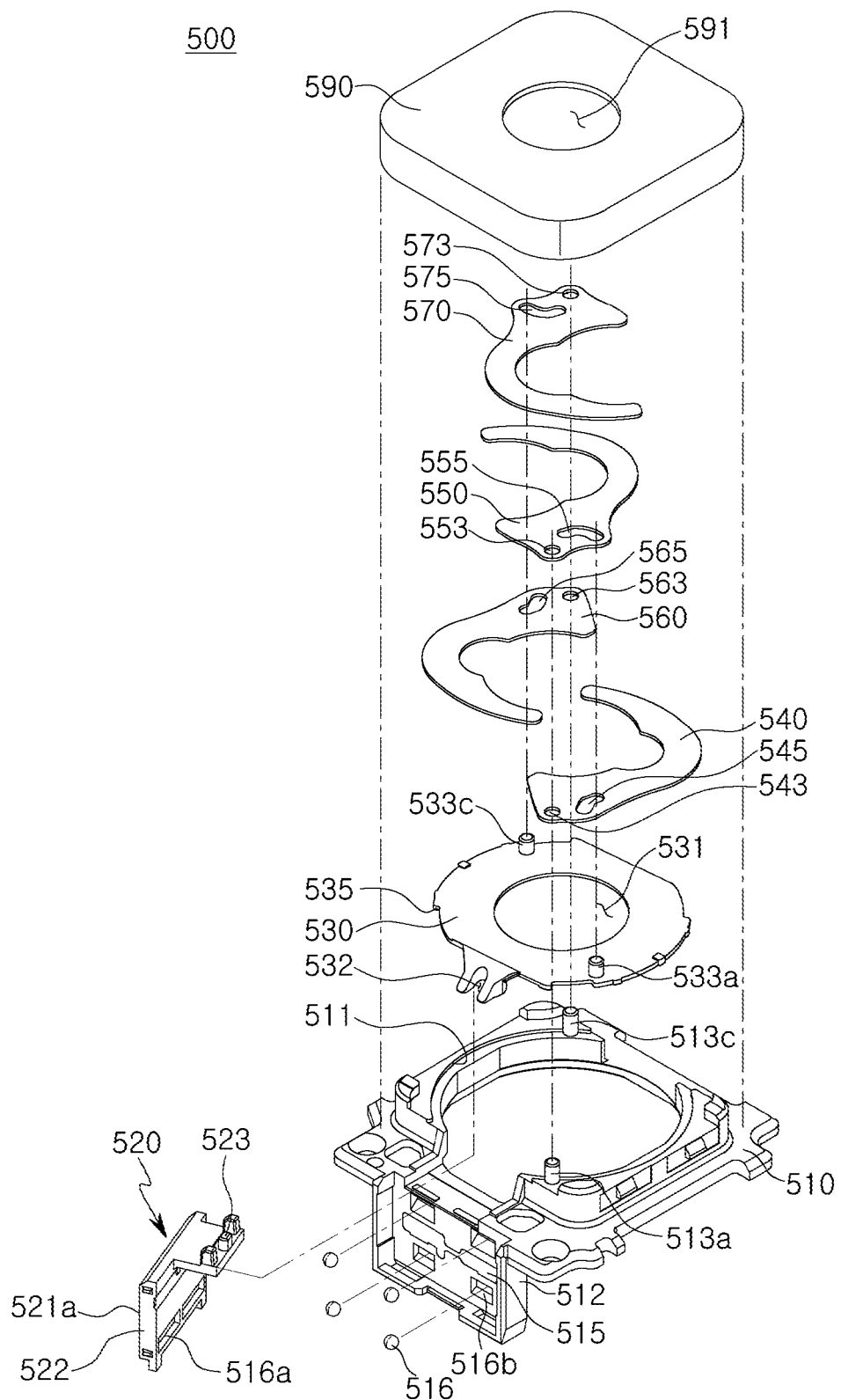
FIG. 5 is an exploded perspective view of an aperture module, with a cover removed, according to an example.
Figure 6A:
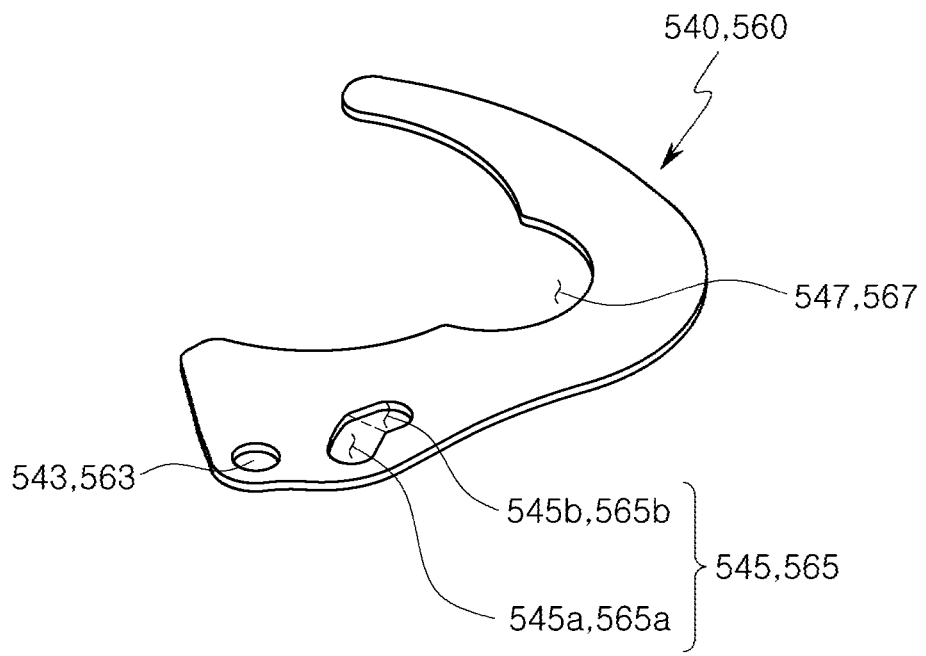
FIGS. 6A and 6B illustrate various examples of a blade provided in an aperture module according to an example.
Figure 6B:
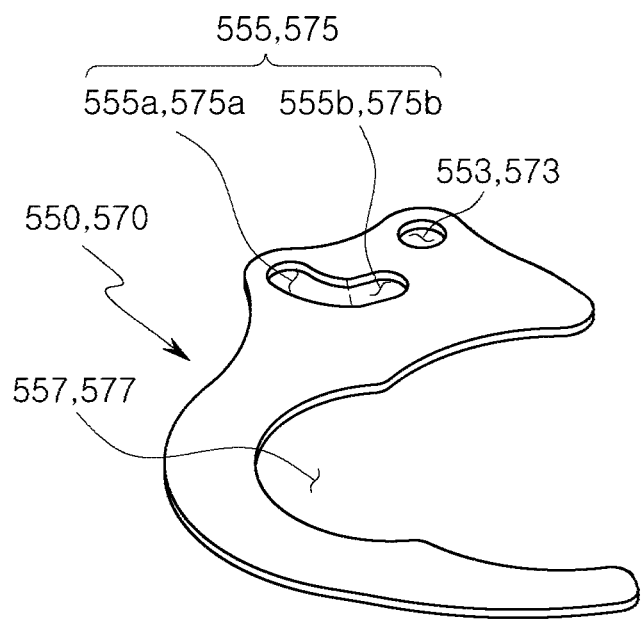

FIG. 4 is a coupled perspective view of an aperture module, with a cover removed, according to an example, FIG. 5 is an exploded perspective view of an aperture module, with a cover removed, according to an example, and FIGS. 6A and 6B illustrate various examples of a blade provided in an aperture module according to an example.

The aperture module 500 may be coupled to the lens module 200 and may be configured to selectively change the amount of light incident on the lens module 200.

Since the aperture module 500 may allow a relatively small amount of light to be incident on the lens module 200 in a high illumination environment and may allow a relatively large amount of light to be incident on the lens module 200 in a low illumination environment, the aperture module 500 may constantly maintain image quality even in various illumination conditions.

The aperture module 500 may be coupled to the lens module 200 to be moved together with the lens module 200 in an optical axis direction, a first direction, and a second direction. For example, the lens module 200 and the aperture module 500 may be moved together during focusing and shaking correction such that a distance between the lens module 200 and the aperture module 500 is not changed.

Referring to FIGS. 2 through 6B, the aperture module 500 includes a base 510, a plurality of blades 540, 550, 560, and 570, and an aperture driving part (including a moving portion 520, including a driving magnet 521a, and a driving coil 521b). In addition, the aperture module 500 may include a position sensor (a hall sensor) 521c which may precisely determine a position of the moving portion 520 to perform closed-loop control. In addition, the aperture module 500 may include a cover 590 covering the base 510 and the plurality of blades 540, 550, 560, and 570 and having a through-hole 591 through which light is incident.

The aperture module 500 includes, for example, blades 540, 550, 560, 570. Although four blades are illustrated in the drawings, this example is not limited thereto and may be applied to all cases in which four or more blades are provided (as long as a plurality of blades are divided into at least two small-aperture blades).

Each of the first to fourth blades 540, 550, 560, and 570 may be provided to have a substantially boomerang shape and may have a bent or round internal side portion. The internal side portions of the first to fourth blades 540, 550, 560, and 570 may be provided with edge-shaped aperture grooves 547, 567, 557, and 577 to form an incidence hole 580. The aperture grooves 547, 567, 557, and 577, provided in blades facing each other (for example, the first and third blades 540 and 560 or the second and fourth blades 550 and 570) may constitute a pair of aperture grooves as edges of circular arcs, having the same radius, or polygons. Sizes of aperture grooves 547, 567, 557, and 577 (for example, a small aperture 581 or a medium aperture 583 larger than the small aperture 581) may be selected depending on a size of an incidence hole to be implemented.

The plurality of blades may be paired two by two to have the same shape. The blades, having the same shape, may be provided symmetrically with respect to an optical axis. For example, the first and third blades 540 and 560 and the second and fourth blades 550 and 570 may be provided symmetrically with respect to the optical axis, respectively. The first and third blades 540 and 560, symmetrically provided, and the second and fourth blades 550 and 570, symmetrically provided, may overlap each other to implement an incidence hole (for example, the small aperture 581 or the medium aperture 583).

The first and third blades 540 and 560 or the second and fourth blades 550 and 570, provided symmetrically with respect to the optical axis, may have the same shape.

In the aperture module 500 according to this example, a circular or polygonal incidence hole 580 may be implemented by a combination of a pair of, for example, two blades. In addition, incidence holes 580 having different sizes (for example, the small aperture 581 or the medium aperture 583) may be implemented intermittently (with multiple stages) by a plurality of blade pairs, each including two blades. A large aperture 582, greater than the medium aperture 583, may be implemented by a through-hole 531 of a rotation plate 530, the through-hole 591 of the cover 590, or a through-hole, not illustrated, of an additionally provided gap spacer, not illustrated. In this case, the plurality of blades, paired two by two, may all be extended outwardly, and thus, the through-hole 531 or the through-hole 591, or the through-hole of the gap spacer may be exposed to implement the large aperture 582.

Since the first to fourth blades 540, 550, 560, and 570 are slidably moved while portions thereof are in contact with each other, the first to fourth blades 540, 550, 560, and 570 may be antistatically treated to prevent the generation of frictional electricity.

The first to fourth blades 540, 550, 560, and 570 may be paired two by two to be provided symmetrically with respect to the optical axis. The first to fourth blades 540, 550, 560, and 570 are linked to the rotation plate 530 to be driven.

The rotation plate 530 may be linked to the moving portion (a magnet portion) 520, linearly reciprocating in a direction, perpendicular to the optical axis direction, and may be rotated about the optical axis by converting a linear motion of the moving portion 520 into a rotational motion.

A center of the rotation plate 530 may be provided with the through-hole 531 through which light passes, and the through-hole 531 may serve as the large aperture 582, a maximum-sized incidence hole, formed by the first to fourth blades 540, 550, 560, and 570. Since the rotation plate 530 is brought into contact with the first to fourth blades 540, 550, 560, and 570, the rotation plate 530 may be antistatically treated to prevent generation of frictional electricity.

The base 510 may be provided with a guide groove 511 to guide a rotational motion of the rotation plate 530, and the rotation plate 530 may be inserted into the guide groove 511 to be rotated while being guided. The rotation plate 530 may have a circular edge. An edge of the rotation plate 530 may be provided with a predetermined groove (an avoidance groove) 535 to avoid an interference with stationary shafts 513a and 513c, or the like, adjacent members. The guide groove 511 may also have a circular edge to correspond to the rotation plate 530 (the edge of the guide groove 511 may be provided with the stationary shafts 513a and 513c, slightly inwardly inserted, and the like).

Even in a case in which the base 510 is not provided with the guide groove 511, a rotation may be naturally induced because driving shafts 533a and 533c of the rotation plate 530 are fitted in the four blades 540, 550, 560, and 570.

The first to fourth blades 540, 550, 560, and 570 may be driven in linkage to the rotation plate 530 when the rotation plate 530 is rotating.

The first to fourth blades 540, 550, 560, and 570 may be provided with rotation shaft holes 543, 553, 563, and 573 and driving shaft holes 545, 555, 565, and 575, respectively. The rotation shaft holes 543, 553, 563, and 573 may be rotatably fitted in the stationary shafts 513a and 513c. The driving shaft holes 545, 555, 565, and 575 may be rotatably and movably fitted in the driving shafts 533a and 533c of the rotation plate 530.

The first to fourth blades 540, 550, 560, and 570 are paired two by two to share the driving shafts 533a and 533c and the stationary shafts 513a and 513c. The driving shaft holes 545 and 555 of the first and second blades 540 and 550 are fitted in the first driving shaft 533a, and the driving shaft holes 565 and 575 of the third and fourth blades 560 and 570 are fitted in the second driving shaft 533c. The rotation shaft holes 543 and 553 of the first and second blades 540 and 550 are fitted in the first stationary shaft 513a, and the rotation shaft holes 563 and 573 of the third and fourth blades 560 and 570 are fitted in the second stationary shaft 513c.

The first and third blades 540 and 560 and the second and fourth blades 550 and 570 may be respectively paired to form the small aperture 581 or the medium aperture 583.

Figure 7A:
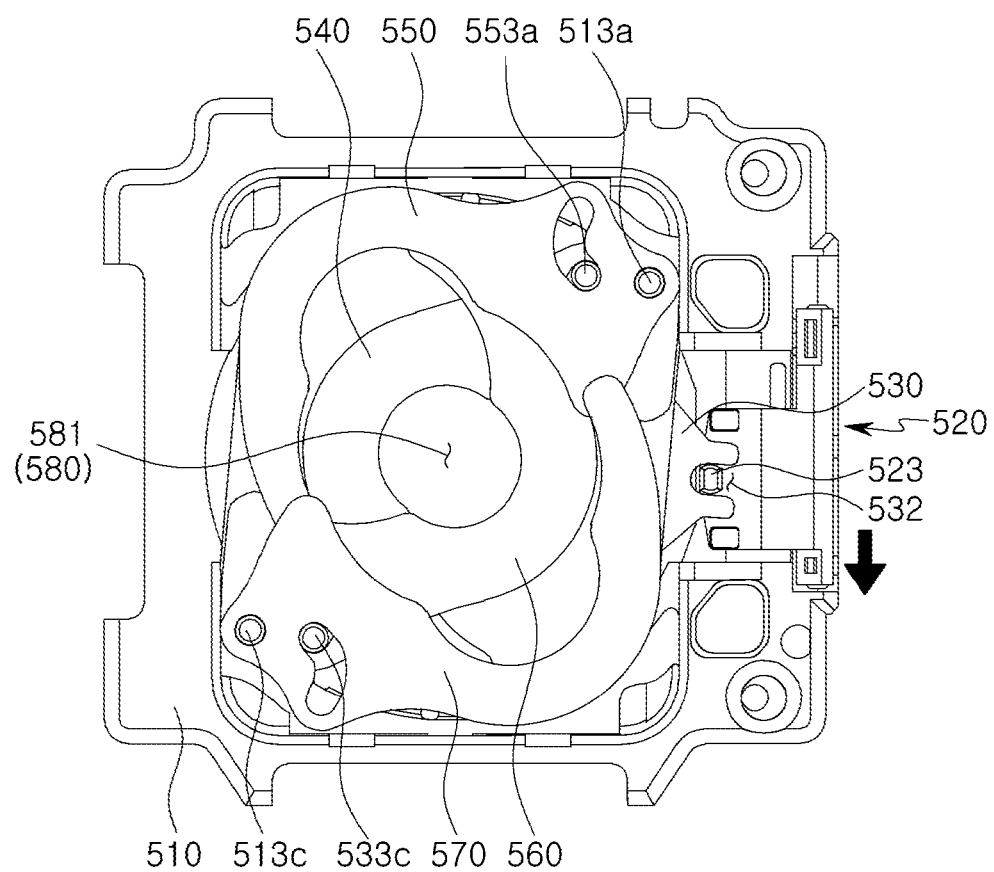
FIGS. 7A, 7B, and 7C are top views illustrating that an aperture module is driven to change a size of an incidence hole according to an example.
Figure 7B:
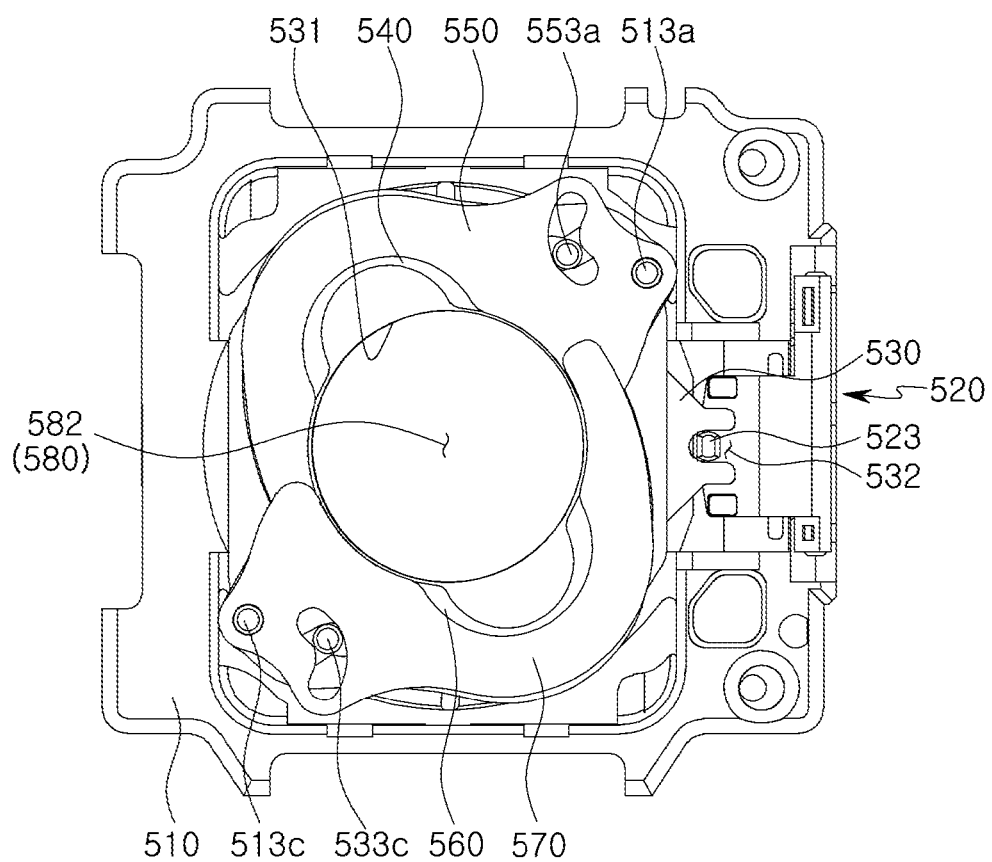
Figure 7C:
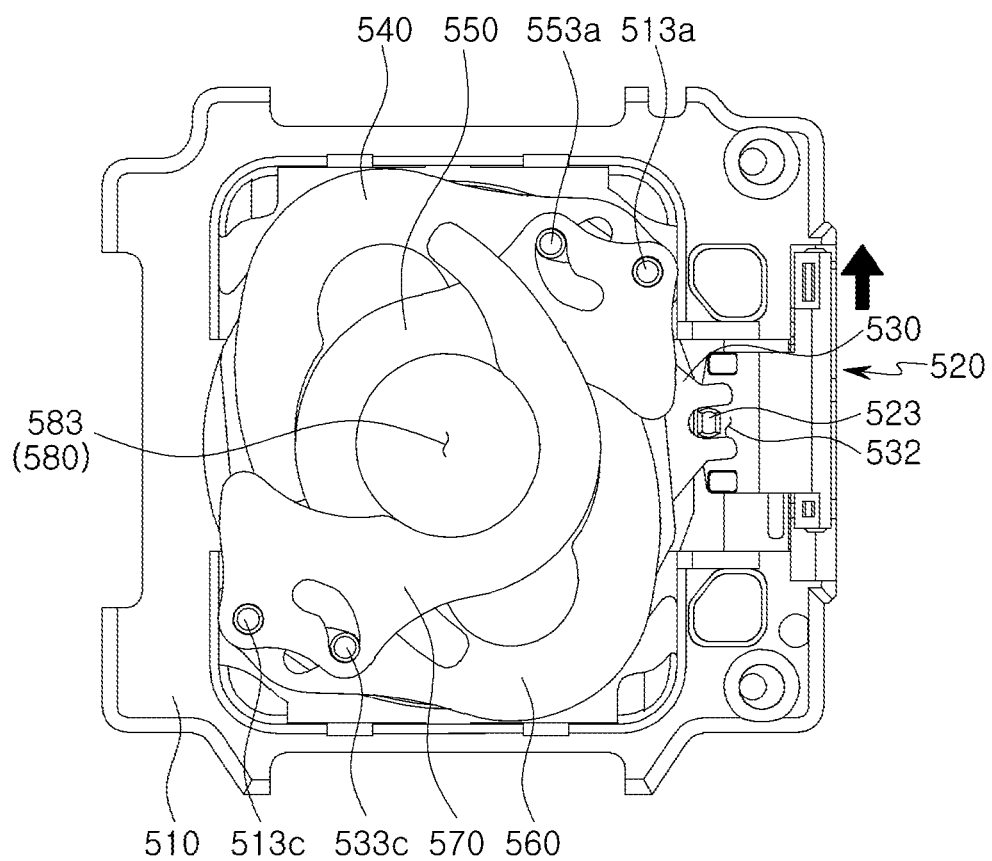
Figure 8:
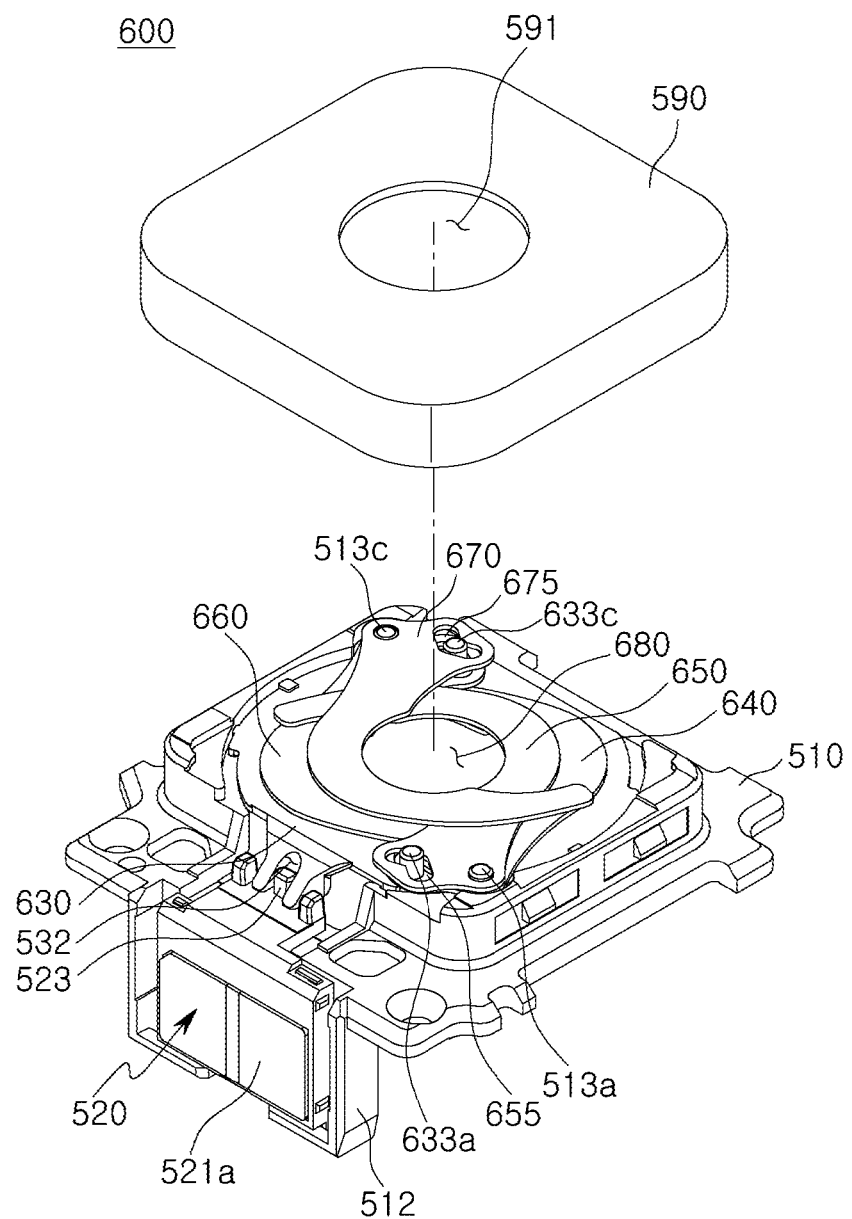
FIG. 8 is a coupled perspective view of an aperture module, with a cover removed, according to another example.
Figure 9:
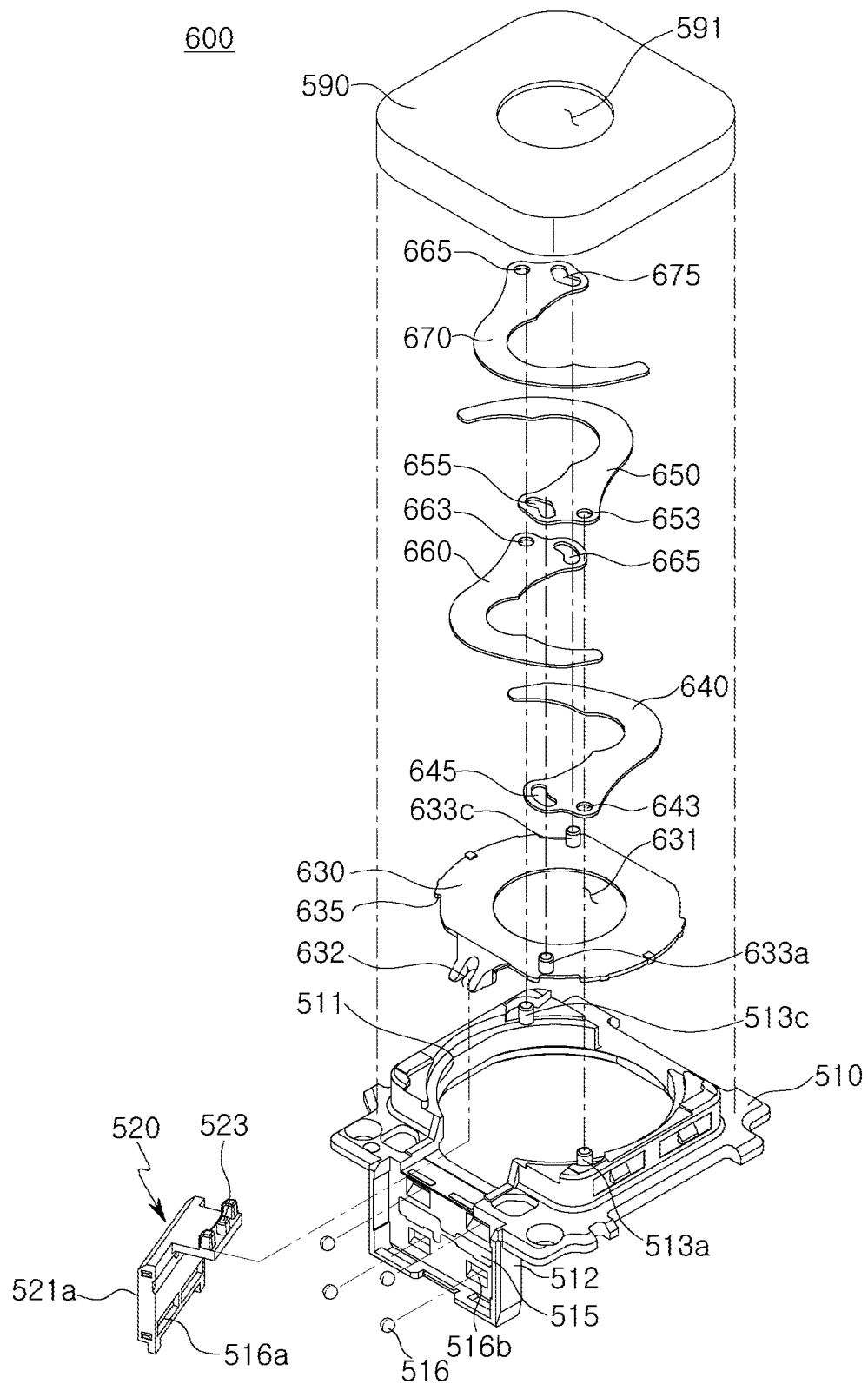
FIG. 9 is an exploded perspective view of an aperture module, with a cover removed, according to another example.
Figure 10A:
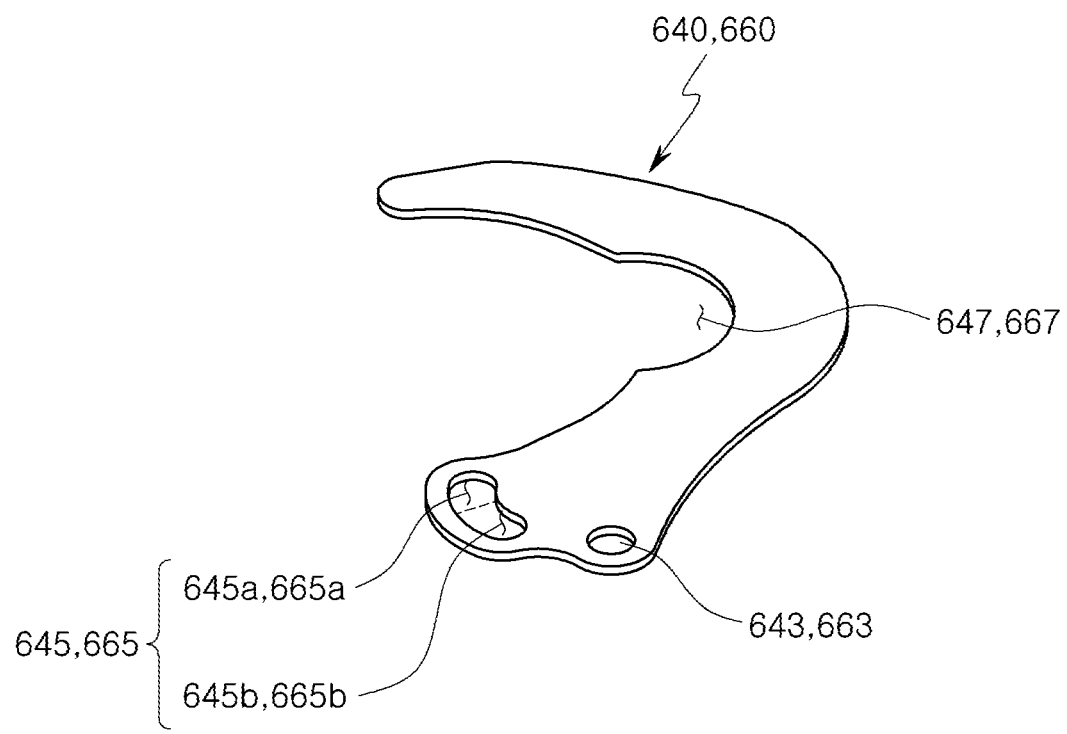
FIGS. 10A and 10B illustrate an example of a blade provided in an aperture module according to another example.
Figure 10B:
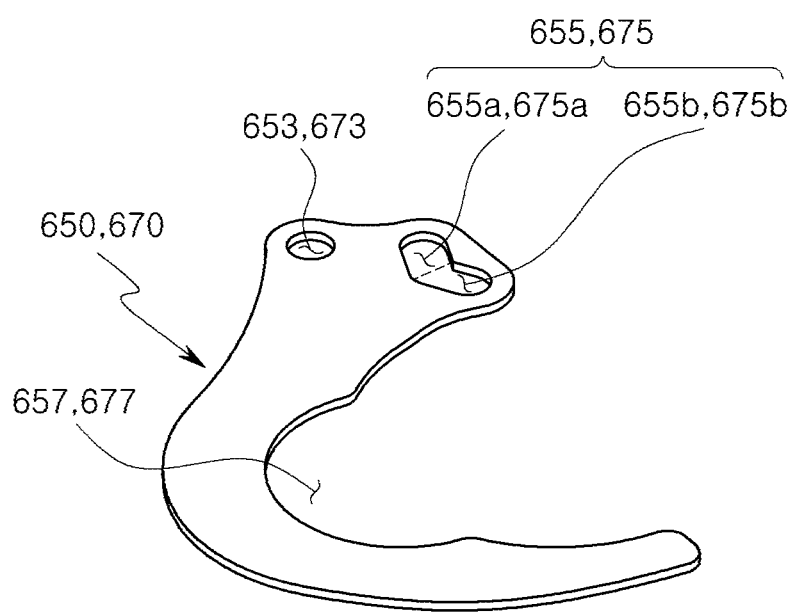

As shown in FIGS. 7A through 7C, the aperture module 500 may implement incidence holes 580 having three sizes such as the small aperture 581, the large aperture 582, and the medium aperture 583. Therefore, to implement the small aperture 581, when the first and third blades 540 and 560 implement the small aperture 581, the other blades may form a medium aperture larger than the small aperture 581 or may be extended outwardly to have an aperture larger than the large aperture. To implement the medium aperture 583, when the second and fourth blades 550 and 570 implement the medium aperture 583, the other blades may be expanded outwardly to have an aperture larger than the medium aperture. To implement the large aperture 582, all of the blades 540, 550, 560, and 570 may be extended outwardly to expose the through-hole 531 of the rotation plate 530 or the through-hole 591 of the cover 590, or the through-hole, not illustrated, of the additionally provided gap spacer, not illustrated. In the case in which the large aperture 582 is implemented by the through-hole 591 of the cover 590, all of the blades 540, 550, 560, 570 may be covered with the cover 590 when the aperture module 500 is viewed right above the optical axis direction, and the through-hole 591 of the cover 590 may serve as the large aperture 582.

The rotation shaft holes 543, 553, 563, and 573, the driving shaft holes 545, 555, 565, and 575, and a guide hole 532, fitted in the projection-shaped stationary shafts 513a and 513c, the driving shafts 533a and 533c, and a driving projection 523 to transfer force or to form a rotation shaft, may have hole shapes or groove shapes although a word 'hole' is included in respective names thereof for ease of description. Additionally, the above-mentioned holes will be used interchangeably with stationary shaft inserting portion 543, 553, 563, and 573, driving shaft inserting portions 545, 555, 565, and 575, and a driving projection inserting portion 532 herein.

Since the rotation shaft holes 543, 553, 563, and 573 of the first to fourth blades 540, 550, 560, and 570 are provided in a circular shape, rotation is only possible while the rotation shaft holes 543, 553, 563, and 573 are fitted in the stationary shafts 513a and 513c.

The driving shaft holes 545, 555, 565, and 575 may be elongated to allow the driving shafts 533a and 533c to be movable while being fitted in the driving shafts 533a and 533c. The driving shaft holes 545, 555, 565, and 575 may include first driving shaft holes 545a, 555a, 565a, and 575a, provided to be inclined with respect to a rotation direction of the rotation plate 530, and second driving shaft holes 545b, 555b, 565b, and 575b disposed parallel to the rotation direction of the rotation plate 530 or provided in such a manner that a blade is extended further outwardly. As a result, the driving shaft holes 545, 555, 565, and 575 may have a center-bent shape. When the driving shafts 533a and 533c move in the first driving shaft holes 545a, 555a, 565a, and 575a, the first to fourth blades 540, 550, 560 and 570 may rotate, and thus, the blades may be contracted inwardly or extended outwardly. When the driving shafts 533a and 533c move in the second driving shaft holes 545b, 555b, 565b, and 575b, the first to fourth blades 540, 550, 560, and 570 may be maintained in a fixed state without moving.

The first to fourth blades 540, 550, 560, and 570 may be contracted inwardly or extended outwardly while the driving shafts 533a and 533b, fitted in the driving shaft holes 545, 555, 565 and 575 of the first to fourth blades 540, 550, 560 and 570, move with the rotation of the rotation plate 530.

In this case, since two blades are paired to form the small aperture 581 or the medium aperture 583, a blade, which does not form an incidence hole, may be extended outwardly to prevent interference with formation of the incidence hole.

For example, when the moving portion 520 moves to one end such that the first and third blades 540 and 560 are contracted inwardly to implement the small aperture 581, the second and fourth blades 550 and 570 may be extended outwardly. When the moving portion 520 moves the other end such that the second and fourth blades 550 and 570 are contracted inwardly to implement the medium aperture 583, the first and third blades 540 and 560 may be extended outwardly. For example, the first and third blades 540 and 560, implementing the small aperture 581, and the second and fourth blades 550 and 570, implementing the medium aperture 583, may move in reverse with the movement of the moving portion 520.

When the moving portion 520 is disposed between one side and the other side, all of the first to fourth blades 540, 550, 560, and 570 may be extended outwardly to expose the through-hole 531 of the rotation plate 530 or the through-hole 591 of the cover 590, or the through-hole, not illustrated, of the additionally provided gap spacer, not illustrated.

In this example, to reduce sensitivity depending on a manufacturing tolerance and to significantly reduce consumption of current while blades are linked to rotation driving of the rotation plate 530, when the moving portion 520 moves to one side, the small aperture 581 may be implemented by the blades (first and third blades 540 and 560). When the moving portion 520 moves to the other side, the medium aperture 583 may be implemented by two blades (second and fourth blades 550 and 570). When the moving portion 520 is disposed between one side and the other side (in a midway position between one side and the other side, for example, a neutral zone), all of the four blades are extended outwardly and the large aperture 582 may be implemented by the through-hole 531 of the rotation plate 530 or the through-hole 591 of the cover 590, or the through-hole, not illustrated, of the additionally provided gap spacer, not illustrated.

In this example, the first to fourth blades 540, 550, 560, and 570 are linked to the rotation plate 530. When the moving portion 520 is moved linearly by the electromagnetic interaction between the driving magnet 521a and the driving coil 521b, the rotation plate 530, linked to the moving portion 520, may rotate. Thus, the first to fourth blades 540, 550, 560, and 570 may be moved to change an aperture of an aperture stop.

Accordingly, the amount of a yoke (a magnetic material) is increased at one end and the other end of the base 510, such that the moving portion 520, including the driving magnet 521a, may be fixed at one end and the other end of the base 510 by magnetic force.

In addition, the amount of the yoke (the magnetic material) is also increased in the midway position between one end and the other end, corresponding to the neutral zone, such that the moving portion 520, including the driving magnet 521a, may be fixed in the neutral zone by the magnetic force. Alternatively, when the driving shafts 533a and 533c are disposed in center-bent portions of the driving shaft holes 545, 555, 565, and 575, each having a center-bent shape, the moving portion 520 may pass through the neutral zone. When the moving portion 520 passes through the center-bent portions of the driving shaft holes 545, 555, 565 and 575, required force may be different from that of other portions.

An aperture driving part includes the moving portion 520, disposed on the base 510 to be movable along one axis, including the driving magnet 521a, and the driving coil 521b fixed to the housing 110 to oppose the driving magnet 521a.

The driving coil 521b is provided on the substrate 900, and the substrate 900 is fixed to the housing 110. The substrate 900 may be electrically connected to a printed circuit board attached to a bottom of the camera module 1000.

The driving magnet 521a is a movable member moving together with the base 510 in an optical axis direction, a first direction, and a second direction, while the driving coil 521b is a fixed member fixed to the housing 110.

Since the driving coil 521b, providing driving force to the aperture module 500, is disposed outside the aperture module 500, for example, on the housing 110 of the camera module, weight of the aperture module 500 may be reduced.

For example, since the driving coil 521b, providing the driving force to the aperture module 500, is provided as a fixed member, the driving coil 521b is not moved during autofocusing or optical image stabilization. Thus, weight increase of the lens module 200, caused by employment of the aperture module 500, may be significantly reduced.

In addition, since the driving coil 521b, providing driving force to the aperture module 500, is disposed in the housing 110 as a fixed member and is electrically connected to the printed circuit board, the lens module 200 and the aperture module 500 do not affect the driving coil 521b of the aperture driving part even when the lens module 200 and the aperture module 500 move during the autofocusing and the optical image stabilization. Thus, an autofocusing function may be prevented from degrading.

In this example, the size of the incidence hole 580 of the aperture stop may be changed to three sizes with multiple stages, and it may be necessary to sense a position of the moving portion 520 to accurately implement the size of the incidence hole. Therefore, in this example, a position sensor 521c may be provided. The position sensor 521c may be disposed to oppose the driving magnet 521a of the moving portion 520 to determine a position of the driving magnet 521a. The position sensor 521c may be a hall sensor and may be installed in the center of the driving coil 521b, fixed to the housing 110, or adjacent to the driving coil 521b. For example, the position sensor 521c may be provided together with the substrate 900 on which the driving coil 521b is provided.

In this example, a closed loop control manner may be used to sense and feedback a position of the moving portion 520 when the moving portion 520 is moving linearly.

The substrate 900 may be provided with a gyrosensor, not illustrated, configured to detect shaking factors such as user's handshaking and the like, and a driver integration circuit (IC), not illustrated, configured to provide a driving signal to coils 810b, 830b, 730, and 521b.

The base 510 is provided with a moving guide 512 in which the moving portion 520 is disposed. The moving guide 512 may have a shape extending from the base 510 in an optical axis direction.

The moving portion 520 includes the driving magnet 521a, disposed to face the driving coil 521b, and a magnet holder 522 to which the driving magnet 521a is coupled. The driving magnet 521a is disposed to oppose the driving coil 521b in a direction perpendicular to the optical axis direction.

The moving portion 520 may be moved in a tight contact with the moving guide 512 of the base 510. Accordingly, the moving guide 512 may be provided with a yoke 515 in such a manner that the moving portion 520 is brought into tight contact with the moving guide 512 by attractive force with the driving magnet 521a of the moving portion 520. A yoke 225 (referring to FIG. 2) may be provided in the lens module 200 in a position corresponding to the moving portion 520. The moving portion 520 may be slidably moved, while maintaining a state of tight contact with the moving guide 512, by attractive forces between the yokes 515 and 225 and the driving magnet 521a.

A bearing may be provided on the base 510 such that the moving portion 520 may be easily moved slidably. For example, a ball bearing 516 may be provided between the moving portion 520 and the moving guide 512, as illustrated in FIG. 5. The moving portion 520 and the moving guide 512 may be provided with respective seating grooves 516a and 516b in which the ball bearing 516 is seated. The bearing is not limited to a ball bearing, and may be in the form of, for example, a rod or plate facilitating slidable movement.

When power is applied to the driving coil 521b, the moving portion 520 may be move in a direction perpendicular to the optical axis direction by the electromagnetic interaction between the driving magnet 521a and the driving coil 521b.

The base 510 may be provided with the guide groove 511 to guide a rotational motion of the rotation plate 530, and the rotation plate 530 may rotate while being inserted into the guide groove 511 to be guided.

The rotation plate 530 may be provided with a guide hole 532 formed to be elongated in one direction. The guide hole 532 may be elongated such that the moving portion 520 is inclined in a moving direction. The guide hole 532 may be in the form of a hole or a groove. For the reference, in the drawings, the guide hole 532 is illustrated as a groove having an open one side.

Accordingly, a driving projection 523, provided on the moving portion 520, may move in the guide hole 532 when the moving portion 520 moves along one axis. As the driving projection 523 moves, the rotation plate 530 may rotate in the guide groove 511 and the first to fourth blades 540, 550, 560, and 570, linked to the rotation plate 530, may implement incidence holes 580 having various sizes while being be contracted or extended (see FIGS. 7A through 7C).

FIGS. 7A through 7C are top views illustrating that an aperture module is driven to change a size of an incidence hole according to an example.

Referring to FIG. 7A, when the moving portion 520 is disposed on one end (moved linearly to one end of the moving guide 512, for example), the small-aperture incidence hole 581, having a smallest size, may be implemented by first and third blades 540 and 560. The other blades (second and fourth blades 550 and 570) may be extended outwardly.

Referring to FIG. 7B, when the moving portion 520 moves from one end to the other end by a predetermined distance and moves to a neutral zone, a midway therebetween, all of the first to fourth blades 540, 550, 560, and 570 may be extended outwardly to expose the through-hole 531 of the rotation plate 530 or the through-hole 591 of the cover 590, or a through-hole, not illustrated, of an additionally provided gap spacer, not illustrated. Thus, a large aperture 582 may be implemented.

Referring to FIG. 7C, when the moving portion 520 is moved to the other end (moved linearly to the other end of the moving guide 512, for example) by driving of the aperture driving part, an incidence hole 583 having a medium aperture may be implemented by second and fourth blades 550 and 570. The other blades (first and third blades 540 and 560) may be extended outwardly.

As described above with reference to FIGS. 7A through 7C, when the moving portion 520 moves from one end to the other end and then returns to the one end, the small aperture 581, the large aperture 582, and the medium aperture 583 may be implemented in this order or reverse order by the first to fourth blades 540, 550, 560, and 570.

When the moving portion 520 is disposed on one end and the other end, the aperture module 500 described with reference to FIGS. 4 through 7C may implement a small-aperture or medium-aperture incidence hole. When the moving portion 520 is disposed between one end and the other end, the aperture module 500 may implement a large-aperture incidence hole. Accordingly, the aperture module 500 may sequentially implement 'the small-aperture incidence hole, the medium-aperture incidence hole, and the large-aperture incidence hole. In this case, there may be a somewhat inefficient aspect because a camera module is generally handled in the order of having the small-aperture incidence hole, the medium-aperture incidence hole, and the large-aperture incidence hole.

Accordingly, an aperture module 600 according to another example illustrated in FIGS. 8 through 11C. The aperture module 600 may implement a small-aperture incidence hole, a medium-aperture incidence hole, and a large-aperture incidence hole while the moving portion 520 moves from one end to the other end.

The aperture module 600 has the same structure and driving mechanism as the aperture module 500 discussed above, except positions of rotation shaft holes and the driving shaft holes, provided in the plurality of blades, a driving shaft of a rotation plate, and a position of a stationary shaft of a base. Hereinafter, when the aperture module 600 is described, the same reference numerals denote the same structures and the detailed descriptions thereof will be omitted, while different reference numerals denote different components and will be described in detail. Although a base of another example is different in position of the stationary shaft, the same reference numerals as those of an example will be used.

Referring to FIGS. 8 through 11C, the aperture module 600 includes a base 510, a plurality of blades 640, 650, 660, and 670, and an aperture driving part (including a moving portion 520, including a driving magnet 521*a* and a driving coil 521*b*). In addition, the aperture module 600 may include a position sensor (a hall sensor) 521*c* to precisely find a position of the moving portion 520 to perform closed loop control. In addition, the aperture module 600 may include a cover 590, covering the plurality of blades 640, 650, 660, and 670, provided with a through-hole 591 through which light is incident.

Each of the first to fourth blades 640, 650, 660, and 670 may be formed in a substantially boomerang shape, and may have an internal side portion bent or rounded. In order to form an incidence hole 680, the internal side portion may be provided with apertures 647, 667, 657, and 677, each having an edge shape of the incidence hole 680. The aperture grooves 647, 667, 657, and 677, provided in blades facing each other (for example, the fifth and seventh blades 640 and 660 or the sixth and eighth blades 650 and 670) may constitute a pair of aperture grooves as edges of circular arcs, having the same radius, or polygons. Sizes of aperture grooves 647, 667, 657, and 677 (for example, a small aperture 681 or a medium aperture 683 larger than the small aperture 681) may be selected depending on a size of an incidence hole to be implemented.

The plurality of blades may be paired two by two to have the same shape. The blades, having the same shape, may be provided symmetrically with respect to an optical axis. For example, the first and third blades 640 and 660 and the second and fourth blades 650 and 670 may be provided symmetrically with respect to the optical axis, respectively. The first and third blades 640 and 660, symmetrically provided, and the second and fourth blades 650 and 670, symmetrically provided, may overlap each other to implement an incidence hole (for example, the small aperture 681 or the medium aperture 683).

In the aperture module 600, a large aperture 683, larger than a medium aperture 682, may be implemented by a through-hole 631 of the rotation plate 630 or a through-hole 591 of the cover 590, or a through-hole, not illustrated, of an additionally provided gap spacer, not illustrated. In this case, the plurality of blades, paired two by two, may all be extended outwardly, and thus, the through-hole 631 or the through-hole 591, or the through-hole of the gap spacer may be exposed to implement the large aperture 683.

The first to fourth blades 640, 650, 660, and 670 may be linked to the rotation plate 630 to be driven.

The rotation plate 630 may be linked to the moving portion (a magnet portion) 520, linearly reciprocating in a direction, perpendicular to the optical axis direction, and may be rotated about the optical axis by converting a linear motion of the moving portion 520 into a rotational motion. A center of the rotation plate 630 may be provided with the through-hole 631 through which light passes, and the through-hole 631 may serve as the large aperture 683, a maximum-sized incidence hole, formed by the first to fourth blades 640, 650, 660, and 670.

The base 510 may be provided with a guide groove 511 to guide a rotational motion of the rotation plate 630, and the rotation plate 630 may be inserted into the guide groove 511 to be rotated while being guided. The rotation plate 630 may have a circular edge. An edge of the rotation plate 630 may be provided with a predetermined groove (an avoidance groove) 635 to avoid an interference with stationary shafts 513*a* and 513*c*, or the like, adjacent members.

The first to fourth blades 640, 650, 660, and 670 may be driven in linkage to the rotation plate 630 when the rotation plate 630 is rotating.

The first to fourth blades 640, 650, 660, and 670 may be provided with rotation shaft holes 643, 653, 663, and 673 and driving shaft holes 645, 655, 665, and 675, respectively. The rotation shaft holes 643, 653, 663, and 673 may be rotatably fitted in the stationary shafts 513*a* and 513*c*. The driving shaft holes 645, 655, 665, and 675 may be rotatably and movably fitted in the driving shafts 633*a* and 633*c* of the rotation plate 630.

The first to fourth blades 640, 650, 660, and 670 are paired two by two to share the driving shafts 633*a* and 633*c* and the stationary shafts 513*a* and 513*c*. For example, the driving shaft holes 645 and 655 of the first and second blades 640 and 650 are fitted in the first driving shaft 633*a*, and the driving shaft holes 665 and 675 of the third and fourth blades 660 and 670 are fitted in the second driving shaft 633*c*. The rotation shaft holes 643 and 653 of the first and second blades 640 and 650 are fitted in the first stationary shaft 513*a*, and the rotation shaft holes 663 and 673 of the third and fourth blades 660 and 670 are fitted in the second stationary shaft 513*c*.

The first and third blades 640 and 660 and the second and fourth blades 650 and 670 may be respectively paired to form the small aperture 681 or the medium aperture 683.

The aperture module 600 may implement incidence holes 680 having three sizes such as the small aperture 681, the medium aperture 682, and the large aperture 683. Therefore, to implement the small aperture 681, when the first and third blades 640 and 660 implement the small aperture 681, the other blades may form a medium aperture larger than the small aperture 681 or may be extended outwardly to have a hole larger than or equal to the medium aperture. To implement the medium aperture 682, when the second and fourth blades 650 and 670 implement the medium aperture 682, the other blades may be expanded outwardly to have an aperture larger than the medium aperture. To implement the large aperture 683, all of the blades 640, 650, 660, and 670 may be extended outwardly to expose the through-hole 631 of the rotation plate 630 or the through-hole 591 of the cover 590, or the through-hole, not illustrated, of the additionally provided gap spacer, not illustrated. In the case in which the large aperture is implemented by the through-hole 591 of the cover 590, all of the blades 640, 650, 660, 670 may be covered with the cover 590 when the aperture module is viewed from above in the optical axis direction, and the through-hole 591 of the cover 590 may serve as the large aperture.

The rotation shaft holes 643, 653, 663, and 673, the driving shaft holes 645, 655, 665, and 675, and a guide hole 632, fitted in the projection-shaped stationary shafts 513a and 513c, the driving shafts 633a and 633c, and a driving projection 523 to transfer force or to form a rotation shaft, may have hole shapes or groove shapes although a word 'hole' is included in respective names thereof for ease of description.

Since the rotation shaft holes 643, 653, 663, and 673 of the first to fourth blades 640, 650, 660, and 670 are provided in a circular shape, rotation is only possible while the rotation shaft holes 643, 653, 663, and 673 are fitted in the stationary shafts 513a and 513c.

The driving shaft holes 645, 655, 665, and 675 may be elongated to allow the driving shafts 633a and 633c to be movable while being fitted in the driving shafts 633a and 633c. The driving shaft holes 645, 655, 665, and 675 may include first driving shaft holes 645a, 655a, 665a, and 675a, provided to be inclined with respect to a rotation direction of the rotation plate 630, and second driving shaft holes 645b, 655b, 665b, and 675b disposed parallel to the rotation direction of the rotation plate 630 or provided in such a manner that a blade is extended further outwardly. As a result, the driving shaft holes 645, 655, 665, and 675 may have a center-bent shape. When the driving shafts 633a and 633c move in the first drive shaft holes 645a, 655a, 665a, and 675a, the first to fourth blades 640, 650, 660 and 670 may rotate, and thus, the blades may be contracted inwardly or extended outwardly. When the driving shafts 633a and 633c move in the second driving shaft holes 645b, 655b, 665b, and 675b, the first to fourth blades 640, 650, 660, and 670 may be maintained in a fixed state without moving.

The first to fourth blades 640, 650, 660, and 670 may be contracted inwardly or extended outwardly while the driving shafts 633a and 633b, fitted in the driving shaft holes 645, 655, 665 and 675 of the first to fourth blades 640, 650, 660 and 670, move with the rotation of the rotation plate 630.

In this case, since two blades are paired to form the small aperture 681 or the medium aperture 682, a blade, which does not form an incidence hole, may be extended outwardly to prevent interference with formation of the incidence hole.

For example, when the moving portion 520 moves to one end such that the first and third blades 640 and 660 are contracted inwardly to implement the small aperture 681, the second and fourth blades 650 and 670 may be contracted inwardly or extended outwardly because they have large apertures. When the moving portion 520 moves to a midway position between one side and the other end such that the second and fourth blades 650 and 670 are contracted inwardly to implement the medium aperture 682, the first and third blades 640 and 660 may be extended outwardly.

When the moving portion 520 is disposed on the other side opposing the one side, all of the first to fourth blades 640, 650, 660, and 670 may be extended outwardly, such that the through-hole 631 of the rotation plate 630 or the through-hole 591 of the cover 590, or the through-hole, not illustrated, of the additionally provided gap spacer, not illustrated, are exposed to implement a large aperture.

When the moving portion 520 is moved along one axis, a driving projection 523, provided on the moving portion 520, may move in the guide hole 632. As the driving projection 523 moves, the rotation plate 630 may rotate in the guide groove 511 and the first to fourth blades 640, 650, 660 and 670, linked to the rotation plate 630, may implement incidence holes 680 having various sizes while being contracted or extracted (see FIGS. 11A to 11C).

Figure 11A:
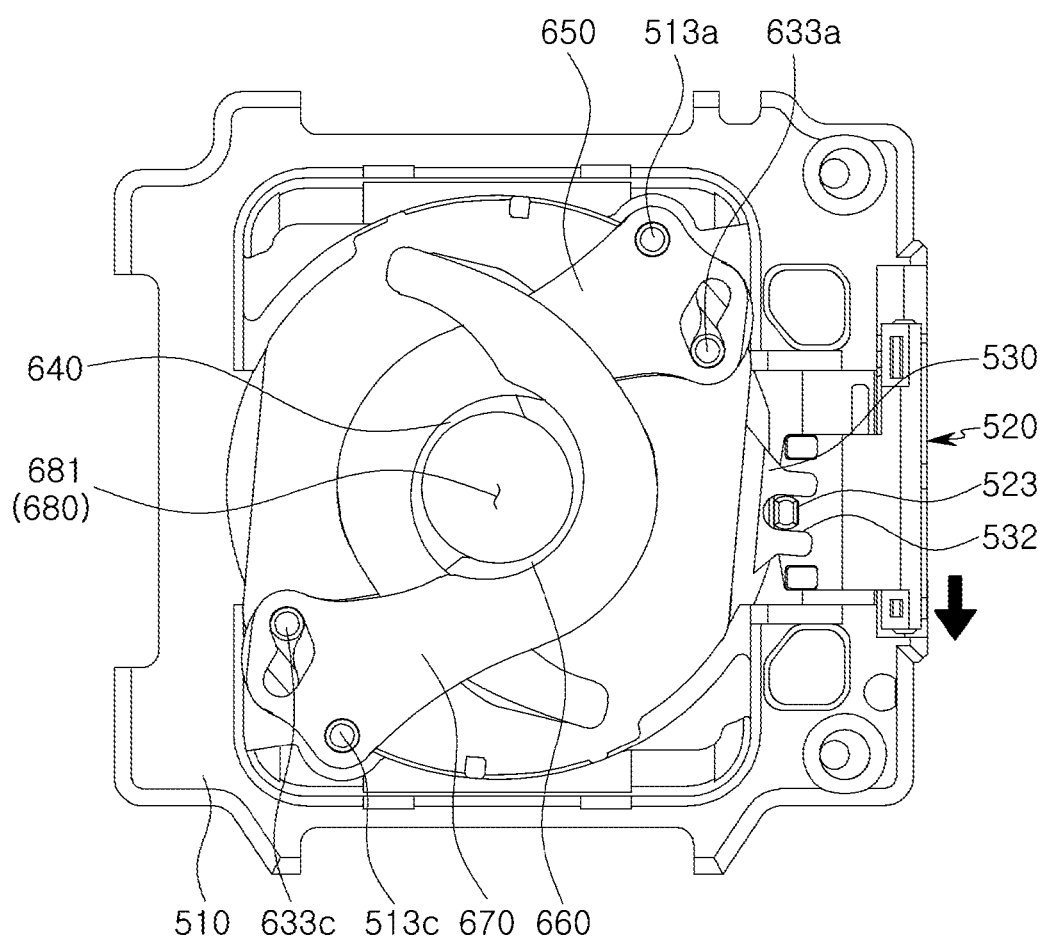
FIGS. 11A, 11B, and 11C are top views illustrating that an aperture module is driven to change a size of an incidence hole according to an example.
Figure 11B:
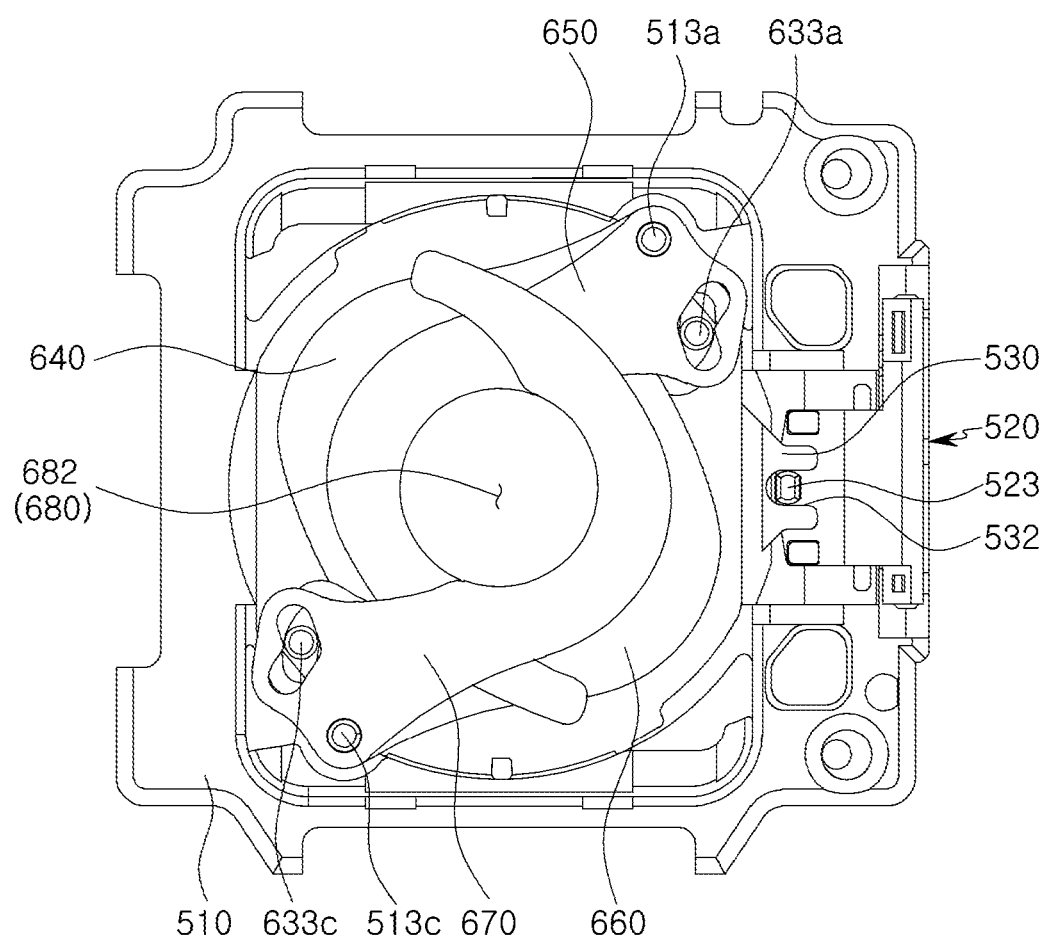
Figure 11C:
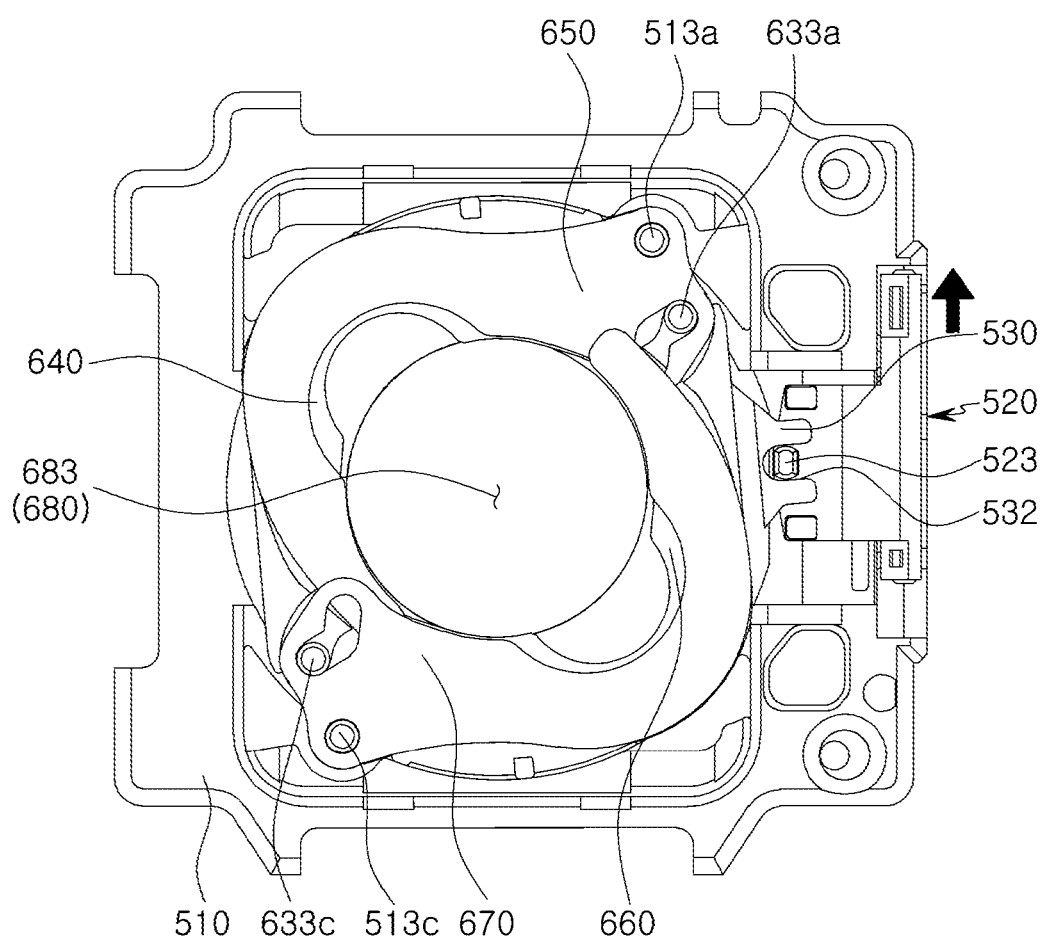

FIGS. 11A to 11C are top views illustrating that an aperture module is driven to change a size of an incidence hole according to an example.

Referring to FIG. 11A, when the moving portion 520 is disposed on one end, a small-aperture incidence hole 681, having a smallest size, may be implemented by first and third blades 640 and 660. The other blades (second and fourth blades 650 and 670), implementing a medium aperture, may be contracted inwardly to form a medium aperture or may be extended outwardly.

Referring to FIG. 11B, when the moving portion 520 moves from one end to the other end by a predetermined distance and moves to a neutral zone, a midway position therebetween, an incidence hole 682 having a medium aperture may be implemented by the second and fourth blades 650 and 670. The other blades (first and third blades 640 and 660) may be extended outwardly.

Referring to FIG. 11C, when the moving portion 520 is moved to the other end opposing one end by driving of the aperture driving part, all of the first to fourth blades 640, 650, 660, and 670 may be extended outwardly to expose the through-hole 631 of the rotation plate 630 or the through-hole 591 of the cover 590, or a through-hole, not illustrated, of an additionally provided gap spacer, not illustrated. Thus, a large aperture 683 may be implemented.

As described above with reference to FIGS. 11A through 11O, when the moving portion 520 moves from one end to the other end and then returns to the one end, the small aperture 681, the medium aperture 682, and the large aperture 683 may be implemented in this order or reverse order by the first to fourth blades 640, 650, 660, and 670.

According to the examples described above, a camera module according to an example may selectively change the amount of light incident through an aperture module, may prevent performance degradation of an autofocusing function even when an aperture module is mounted in the camera module, and may significantly reduce an increase in weight caused by employment of the aperture module. In addition, the camera module may significantly reduce power consumption caused by driving of an aperture.

As described above, an aperture module, which may implement an accurate aperture of an aperture stop while reducing use of current, may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An aperture module comprising:
a rotation plate disposed on a base;

a moving portion configured to move linearly to rotate the rotation plate; and
blades linked to the rotation plate and configured to form an aperture having a variable size,
the blades comprise at least two small-aperture blades configured to be contracted inwardly toward an optical axis to form the aperture having a first size,
the blades comprise at least two medium-aperture blades configured to be contracted inwardly toward the optical axis to form the aperture having a second size larger than the first size, and
the at least two small-aperture blades and the at least two medium-aperture blades are configured to be extended outwardly away from the optical axis to form the aperture having a third size larger than the second size.

2. The aperture module of claim 1, wherein the at least two small-aperture blades are contracted inwardly to form the aperture having the first size when the moving portion is moved to a first end of a linear path,
the at least two medium-aperture blades are contracted inwardly to form the aperture having the second size when the moving portion is moved to a second end of the linear path opposite the first end, and
the at least two small-aperture blades and the at least two medium-aperture blades are extended outwardly to form the aperture having the third size when the moving portion is disposed at a predetermined position of the linear path between the first end and the second end.

3. The aperture module of claim 2, wherein the at least two medium-aperture blades are maintained in an outwardly extended state when the moving portion is moved from the predetermined position to the first end.

4. The aperture module of claim 3, wherein each of the medium-aperture blades comprises a rotation shaft hole into which a rotation shaft of the rotation plate is inserted, and
the rotation shaft hole includes a section disposed parallel to a rotation direction of the rotation plate.

5. The aperture module of claim 2, wherein the at least two small-aperture blades are maintained in an outwardly extended state when the moving portion is moved from the predetermined position to the second end.

6. The aperture module of claim 5, wherein each of the small-aperture blades comprises a rotation shaft hole into which a rotation shaft of the rotation plate is inserted, and
the rotation shaft hole includes a section disposed parallel to a rotation direction of the rotation plate.

7. The aperture module of claim 2, wherein the at least two small-aperture blades are contracted inwardly to form the aperture of the first size and the at least two medium-aperture blades are extended outwardly to expose the aperture of the first size when the moving portion is moved to the first end.

8. The aperture module of claim 2, wherein the at least two medium-aperture blades are contracted inwardly to form the aperture of the second size and the at least two small-aperture blades are extended outwardly to expose the aperture of the second size when the moving portion is moved to the second end.

9. The aperture module of claim 1, wherein the rotation plate comprises a through-hole having a size larger than the second size, and the at least two small-aperture blades and the at least two medium-aperture blades are extended outwardly to expose the through-hole when the moving portion is disposed at the predetermined position.

10. The aperture module of claim 1, further comprising:
a cover covering the base and comprising a through-hole, wherein the through-hole has a size larger than the second size and smaller than the third size.

11. The aperture module of claim 1, wherein a shape of the aperture having the first size and a shape of the aperture having the second size are circular.

12. The aperture module of claim 1, wherein each of the blades has a boomerang shape.

13. The aperture module of claim 12, wherein each of the at least two small-aperture blades has a circular arc-shaped groove that forms a portion of the aperture having the first size, and each of the at least two medium-aperture blades has a circular arc-shaped groove that forms a portion of the aperture having the second size.

14. The aperture module of claim 1, wherein the rotation plate comprises a first rotation shaft and the at least two small-aperture blades are connected to the first rotation shaft and configured to be driven in linkage to the rotation plate when the rotation plate is rotated, and
the rotation plate comprises a second rotation shaft and the at least two medium-aperture blades are connected to the second rotation shaft and configured to be driven in linkage to the rotation plate when the rotation plate is rotated.

15. The aperture module of claim 14, wherein the base comprises a first stationary shaft and the at least two small-aperture blades are connected to the first stationary shaft, and
the base comprises a second stationary shaft and the at least two medium-aperture blades are connected to the second stationary shaft.

16. The aperture module of claim 15, wherein the first stationary shaft is disposed symmetrically to the second stationary shaft with respect to the optical axis.

17. An aperture module comprising:
a rotation plate disposed on a base;
a moving portion configured to move linearly to allow the rotation plate to rotate; and
blades linked to the rotation plate and configured to form an aperture having a variable size,
wherein the blades comprise at least two small-aperture blades configured to be contracted inwardly toward an optical axis to form the aperture having a first size when the moving portion is moved to a first end of a linear path and configured to be extended outwardly away from the optical axis when the moving portion is disposed at a predetermined position of the linear path between the first end and a second end of the linear path,
the blades comprise at least two medium-aperture blades configured to be contracted inwardly toward the optical axis to form the aperture having a second size larger than the first size when the moving portion is disposed at the predetermined position, and
all of the blades are configured to extend outwardly away from the optical axis when the moving portion moves to the second end of the linear path.

18. A camera module, comprising:
a housing;
a lens module accommodated in the housing and comprising a lens barrel having one or more lenses;
an aperture module disposed between an object and the lens module and configured to adjust an amount of incident light on the one or more lenses, the aperture module comprising:
a moving portion configured to move along a linear path; and blades configured to rotate based on movement of the moving portion along the linear path to form an aperture through which the incident light passes, the blades comprising at least two first blades configured to be rotated inwardly toward an optical axis to form the aperture having a first size and at least two second blades configured to be rotated inwardly toward the optical axis independently of the at least two first blades to form the aperture having a second size larger than the first size.

19. The camera module of claim 18, wherein the at least two first blades and the at least two second blades are configured to be rotated outwardly away from the optical axis to form the aperture having a third size different from the first size and the second size.

20. The camera module of claim 19, wherein the at least two first blades form the aperture having the first size when the moving portion is disposed at a first end of the linear path, the at least two second blades form the aperture having the second size when the moving portion is disposed at a second end of the linear path, and the at least two first blades and the at least two second blades form the aperture having the third size when the moving portion is disposed at a position between the first end and the second end of the linear path.

21. The camera module of claim 20, wherein the third size is larger than the first size and the second size.

22. The camera module of claim 20, wherein the third size is larger than the first size and smaller than the second size.

* * * * *